United States Patent [19]

Summerville et al.

[11] Patent Number: 5,367,456
[45] Date of Patent: Nov. 22, 1994

[54] HIERARCHICAL CONTROL SYSTEM FOR AUTOMATICALLY GUIDED VEHICLES

[75] Inventors: David F. Summerville, Garland; John P. Williston; Martin A. Wand, both of Plano; Thomas J. Doty, Dallas, all of Tex.

[73] Assignee: Texas Instruments Incorporated, Dallas, Tex.

[21] Appl. No.: 647,671

[22] Filed: Jan. 24, 1991

Related U.S. Application Data

[60] Division of Ser. No. 265,068, Oct. 31, 1988, abandoned, which is a continuation-in-part of Ser. No. 129,914, Dec. 4, 1987, Pat. No. 4,887,013, which is a division of Ser. No. 771,379, Aug. 30, 1985, abandoned.

[51] Int. Cl.$^5$ .......................... G06F 15/50; G06F 9/38
[52] U.S. Cl. .................. 364/424.02; 395/650
[58] Field of Search ............. 364/424.02, 200, 900; 395/650, 800

[56] References Cited

U.S. PATENT DOCUMENTS

| | | | |
|---|---|---|---|
| 4,015,804 | 4/1977 | Dobler | 364/436 |
| 4,023,753 | 5/1977 | Dobler | 364/436 |
| 4,384,324 | 5/1983 | Kim et al. | 364/200 |
| 4,616,320 | 10/1986 | Meier et al. | 364/513 |
| 4,956,777 | 9/1990 | Cearley et al. | 364/424.02 |

FOREIGN PATENT DOCUMENTS 0213939  11/1987  European Pat. Off. ...... G05D 1/03
WO88/04081  6/1988  WIPO .......................... G06F 15/50

*Primary Examiner*—Vincent N. Trans
*Attorney, Agent, or Firm*—Wade J. Brady; Richard L. Donaldson; Frederick J. Telecky

[57] ABSTRACT

The invention is a modular and hierarchically organized set of computer programs which comprise methods for controlling a system of semi-autonomous automatically guided vehicles, such as mobile robots. The methods include control programs which: execute in stationary control computers; communicate between the stationary control computer programs and corresponding programs which execute in mobile control computers aboard the vehicles; operate independently in mobile control computers aboard the vehicles. The invention allows the system executive program to command the mobile vehicles to start, to stop, to transfer material to or from the vehicles, to change batteries in the vehicles, to park the vehicles at specific points in a factory, to move the vehicles from point to point in a factory, and to remove the vehicles from the factory. The invention improves the performance of conventional automatically guided vehicle systems by maximizing the autonomy of individual vehicles while retaining sufficient supervisory control at the system executive level to provide the maximum flexibility in routing and scheduling the activity of the vehicles. The invention "closes the loop" in an automatically guided vehicle system by providing the highest level of control between mobile vehicles and stationary control computers.

10 Claims, 8 Drawing Sheets

HIERARCHICAL CONTROL SYSTEM FOR AUTOMATICALLY GUIDED VEHICLES

This application is a division of application Ser. No. 265,068, filed Oct. 31, 1988, abandoned, which is a continuation-in-part of application Ser. No. 129,914, filed Dec. 4, 1987, now U.S. Pat. No. 4,887,013, which is a divisional of application Ser. No. 06/771,379, filed Aug. 30, 1985, now abandoned.

RELATED U.S. PATENT APPLICATIONS

This invention is related to the following U.S. Patent Applications, assigned to Texas Instruments Incorporated, and all filed on Aug. 30, 1985 which by reference are incorporated herein: Ser. Nos.:771,397; 771,433; 772,061; 771,380; 771,432; 771,431; 772,280; 771,422; 771,443; 771,322; 771,379; 771,329; 771,459; and 771,545.

This invention is related to the following U.S. Patent Applications, assigned to Texas Instruments Incorporated, which by reference are incorporated herein, Ser. Nos.: 222,322 (filed on Jul. 20, 1988); 195,345 (filed on May 12, 1988); 129,914 (filed on Dec. 4, 1987); 909,737 (filed on Sep. 19, 1986); and 191,834 (filed on May 9, 1988).

This invention is related to the following U.S. Patent Applications, assigned to Texas Instruments Incorporated, and all filed on Oct. 31 1988, which by reference are incorporated herein, Ser. Nos.: 07/265,206; 07/265,070; 07/265,068; 07/265,207; and 07/265,196.

BACKGROUND OF THE INVENTION

1. Field of the Invention

This invention relates to control methods for systems of multiple autonomous or semi-autonomous automatically guided vehicles (AGVs) such as mobile robots and more specifically to a hierarchy of multiple, independently operating, but integrated, software tasks.

2. Description of the Related Art

Conventional automatically guided vehicles (AGVs) such as those used to move materials in warehouses and factories provide minimal (unidirectional) point-to-point movement control. Most such systems involve AGVs which follow a fixed guide track, usually either a radio transmitter antenna wire buried in the factory floor, a reflective stripe painted on the floor, or a reflective tape glued to the floor. Such methods are described in U.S. Pat. Nos. 4530056, 4554724, 4562635, 4593238, and 4593239. All of these schemes purposely limit the individual vehicle's freedom of movement by constraining the AGVs to follow a physically fixed path. These systems typically employ relatively simple control methods which, by virtue of their simplicity, are not very flexible. That is, it is difficult to add or remove vehicles from the system and both difficult and expensive to change the existing pathways.

The majority of multiple-vehicle systems are wire-guided. Guide wires buried in a channel cut in the floor of the factory contain locator strips or cross-wise antennas to provide AGV location information. Sometimes, such systems provide absolute location information by attaching bar-code markers at a fixed height along the path. When an AGV passes such a marker, it "reads" the location from the marker. Wire-guided AGVs detect the location markers via radio reception. Stripe-guided AGVs use optical detectors to sense coded reflective markers. Other AGVs, such as automated fork-lifts, employ bar-code scanners to decode the location markers. Altering the pathways for any of these systems involves considerable facilities engineering, especially in the case of those which use buried wires.

In such systems, therefore, the individual AGVs are not capable of true point-to-point motion. For example, to drive an AGV to a particular point, the system controller commands it to move until it finds the marker for that point. The AGV effectively is "lost" to the control system until it reaches a location marker. Moreover, the AGV must stay on the physical track, passing each and every intermediate marker in the physically fixed sequence, until it "reads" its destination. There is no external position sensing and reporting system to provide "closed-loop, servo-like" operation.

Since most AGVs are front-drive units, or three-wheeled vehicles similar to tricycles (one steered drive wheel in front, two differentiated trailing wheels at the rear), they have less control when moving in reverse.

Important disadvantages to these systems include: they are limited by closed pathways, by unidirectional motion, by lack of external control of AGV motion, and by lack of independent, real-time control of individual vehicles (i.e., there is no way to redirect Vehicle I directly from Point A to Point X while it is en route to an original destination, say Point M).

There is a growing need for AGV systems with true point-to-point AGV motion, external sensing, real-time communication with individual AGVs, programmable pathways (logical, not physical paths), and modern control computer architectures.

For example, in a typical AGV installation the factory is divided into "blocks." Each block may be an area of the factory wherein AGVs service a given family of machinery. Alternatively, each block could be a separate room in the factory. From a control standpoint, a "block" is simply an area of the factory where only one AGV can operate at a time. This greatly simplifies the control task, but the price extracted by this method may sometimes be too high: no block can use two independently operating AGVs simultaneously. While this may not seem to be a great hardship, consider the reasons for using AGVs in the first place: to improve productivity, to improve personnel safety, and to lower costs. If traditional systems are inflexible, the productivity improvements suffer. As productivity suffers, costs rise.

Solving these problems in traditional AGV systems results in ever more complex control schemes. Blocks may be subdivided into "tracks" or "cells." Once an AGV enters a block, it is immediately assigned to a subdivision (perhaps one of several rows of machinery or load stations). While such a method frees up the remaining cells, the cost in control complexity and time can be significant in installations with many AGVs.

More modern control methods are used in the Texas Instruments systems, such as those disclosed in Texas Instruments application 10942 (U.S. Ser. No. 771,397), where an external system executive coordinates the tasks of multiple, independently running, computerized control programs which include a communications controller, a central data base, on-board vehicle controllers, a vehicle routing and scheduling controller, and a visual navigation system to provide factory-floor position information updates to free-roving mobile robot AGVs which incorporate on-board dead reckoning. In the TI systems, the AGVs travel within programmable pathways. The AGVs are omnidirectional and can rotate in place; that is, they have a zero turning radius and can move with equal control in any direction. This scheme allows the AGVs to operate in a minimum of pathway space but simultaneously to service a factory layout with maximum efficiency. Furthermore, since the path is not physically attached to the floor, and since the external control scheme can identify the individual AGVs separately, the AGVs can pass each other in any direction, with or without stopping.

Such modern control schemes require three major control system innovations: a modular and hierarchical design for the overall control system; autonomous or semi-autonomous AGVs; and "intelligent" controllers.

"Intelligent" means that the control programs are capable of simultaneous and independent operation. The operating system for the system executive is a real-time, multi-tasking program. These characteristics allow the various parts of the control system to act independently. The central data base concept adds the capability for the independent tasks to access information from other tasks. The effect is to maximize both control (through the hierarchy) and autonomy. Therefore, each independent task must be capable of controlling itself and of interacting with the distributed control system autonomously.

SUMMARY OF THE INVENTION

The invention is a computer program which comprises sets of routines or subroutines operating as several different "intelligent" control tasks in the AGV system control computer. The system controller operates under a real-time, multitasking operating system. This gives the control system the ability to maximize both control and autonomy in the system: the individual tasks are autonomous, but they share a central data base and operate under the supervision of the system executive program.

In this environment, the invention acts as a control link between an individual AGV and the system controller. The invention provides the means to associate routing and scheduling assignments with a particular AGV quickly and easily using a computer terminal.

The integrated, modular organization allows the invention to be more flexible than traditional AGV control systems.

TERMS USED IN DESCRIBING THE INVENTION

The discussions in this application include such terms as: factory map, nodes, path, path segments, program, routine, subroutine, multitasking, and task.

The physical operating environment of the invention is assumed to be the central control computer of an AGV system operating in a factory. The separate but simultaneously operating parts of the overall control system (i.e., the individual programs of which the invention is one) are located in separate computers which are connected by various communications links. Furthermore, from the invention's viewpoint (as shown in FIG. 1), control passes in and out through a communications controller task to the several tasks which the control system comprises. The control system as a whole runs under a multi-tasking operating system; that is, several tasks may share a single processor, coexisting according to the operation of the highest-level task which coordinates the separate tasks so that, in effect, to a human observer they all appear to be running simultaneously.

Each task (e.g., communication, determining a route, determining a schedule, locating an AGV's position in the factory, etc.) may be a single program or a group of programs, depending upon the limitations of the computer in which the task operates. Each program, in turn, may be a single routine, a group of routines, or a combination of routines and subroutines.

When the AGV control system is installed in the factory, the system operators "describe" the factory to the system control computer by building a "factory map" in the computer's memory. This logical map corresponds to a physical map of the factory which is made using measuring tapes or surveyor's equipment to determine the exact location of each machine, each node, and each visual navigation system camera relative to an arbitrary but fixed point called the factory origin. This map is a logical representation of the physical factory.

The information in the factory map includes the logical representation of the physical location of each node in the system. A node is any point along a pathway which is "significant" to the control system. For example, typical nodes include machine locations, parking locations, battery exchange station location, intersections, special turning points, AGV service areas, and the like. A path segment is a set of two adjacent nodes and the empty space which lies along the line between them. A path is a collection of path segments which represents a route of travel between two particular nodes.

The factory map is stored in another computer memory as part of a shared central data base. Each of the tasks in the system has access to this store of data. This makes it easy to modify an individual task (and so change the control method) without having to change all the other tasks.

DESCRIPTION OF THE PREFERRED EMBODIMENT

Figure 1A:
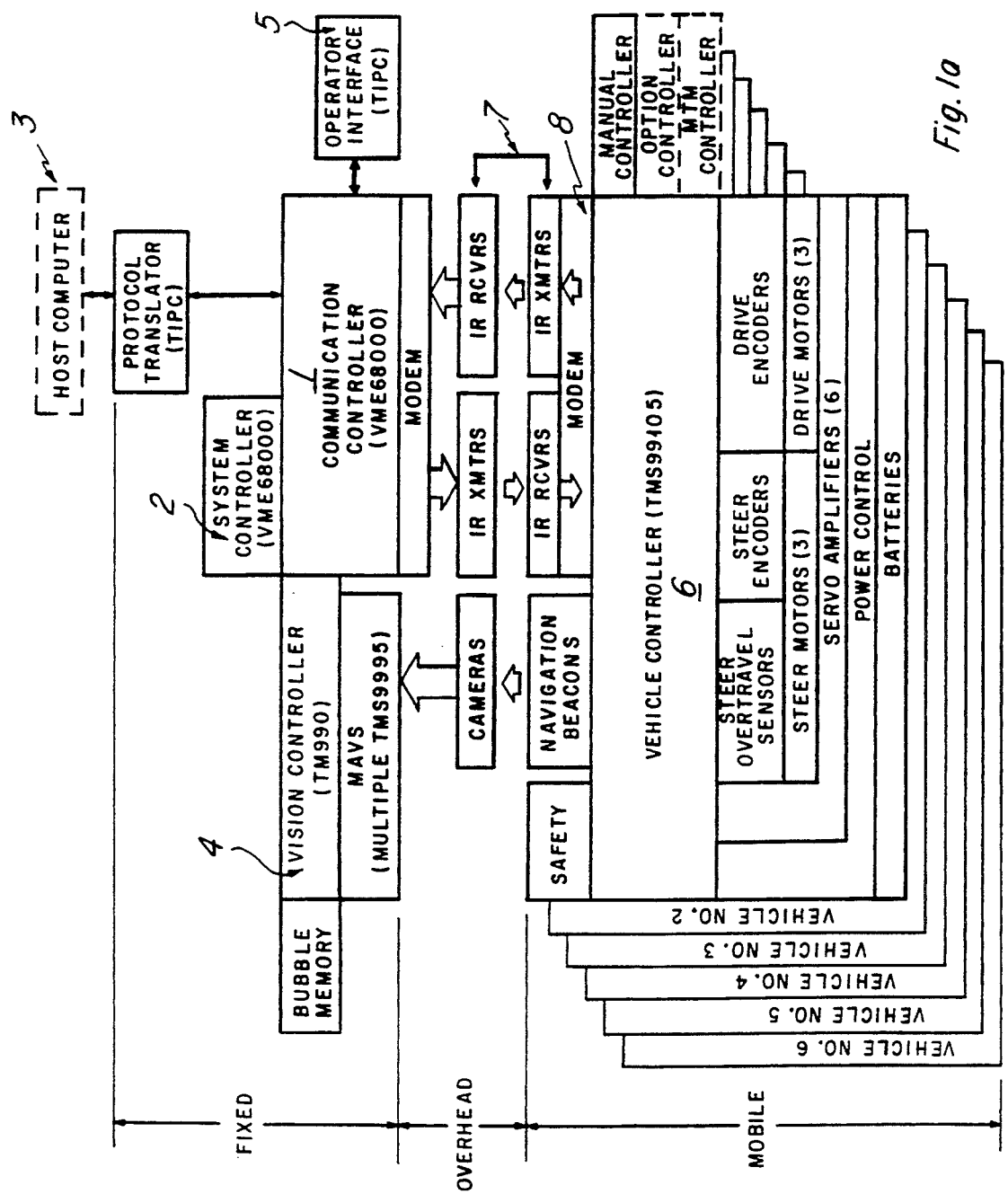
FIGS. 1A and 1B are drawings which have one illustration which shows the physical elements (computers, modems, and the like) of the system of which the invention is a part and another illustration which shows the control hierarchy of the software comprised by the invention.
Figure 1B:
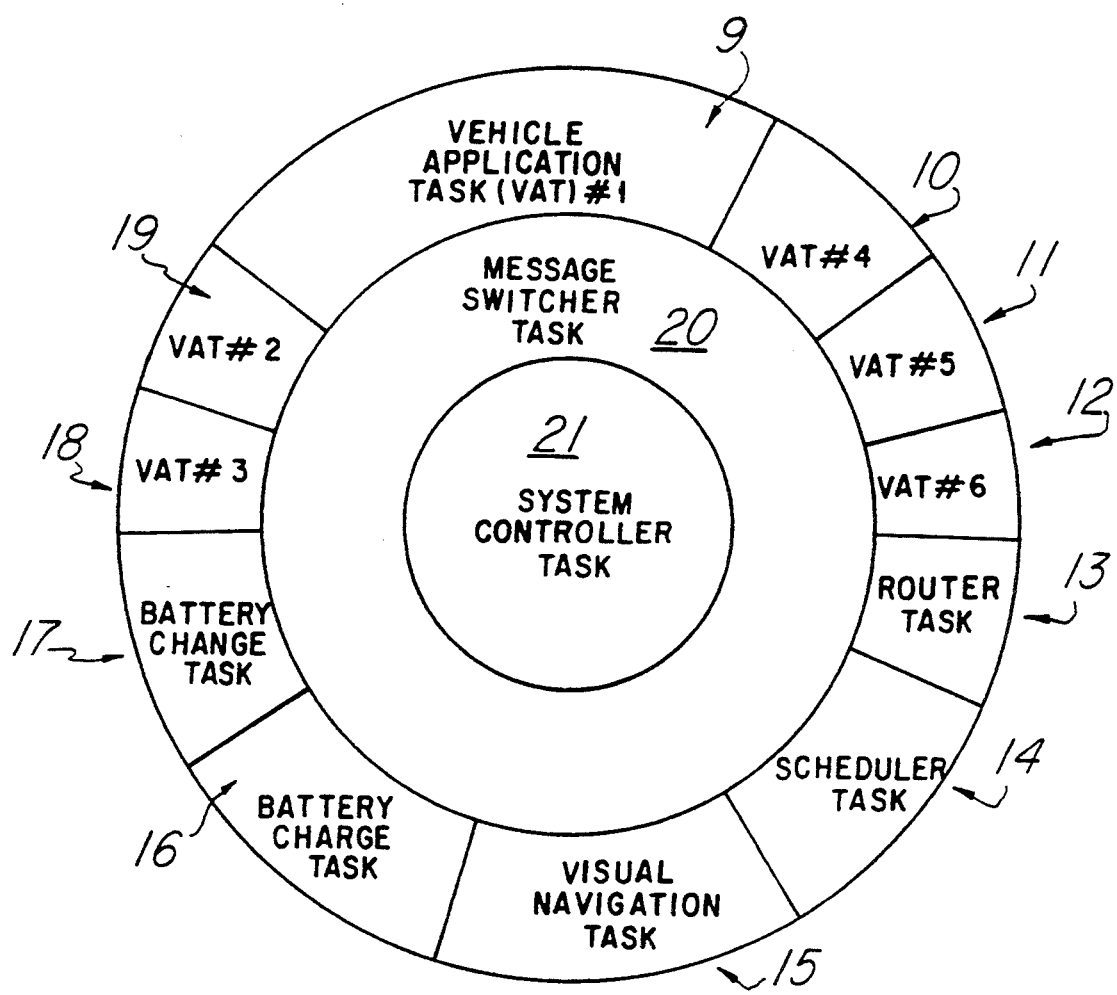

In the TI systems, the overall control scheme is that of a hierarchically organized, modular, distributed computer system, as outlined in FIG. 1. Each AGV has an on-board control computer 6, in which a number of control programs may operate independently but simultaneously depending upon the job the AGV is called upon to do. The AGV communicates with the external system controller 2 via a wireless infrared transceiver system 7 and an electronic modulator/demodulator (modem) 8. The external multitasking operating system 5 makes possible the coexistence of several other independent programs 9 through 21, each designed to do a particular set of tasks. For example, a communications controller program in the communication controller 1 includes a task 20 called the message switcher. This task acts as the communications link between the various software tasks in the system. In the TI systems, the invention described herein is a set of programs called the Vehicle Application Task, shown in FIG. 1 as 9 through 12 and 18 through 19. There is a separate Vehicle Application Task for each AGV in the system.

Figure 2:
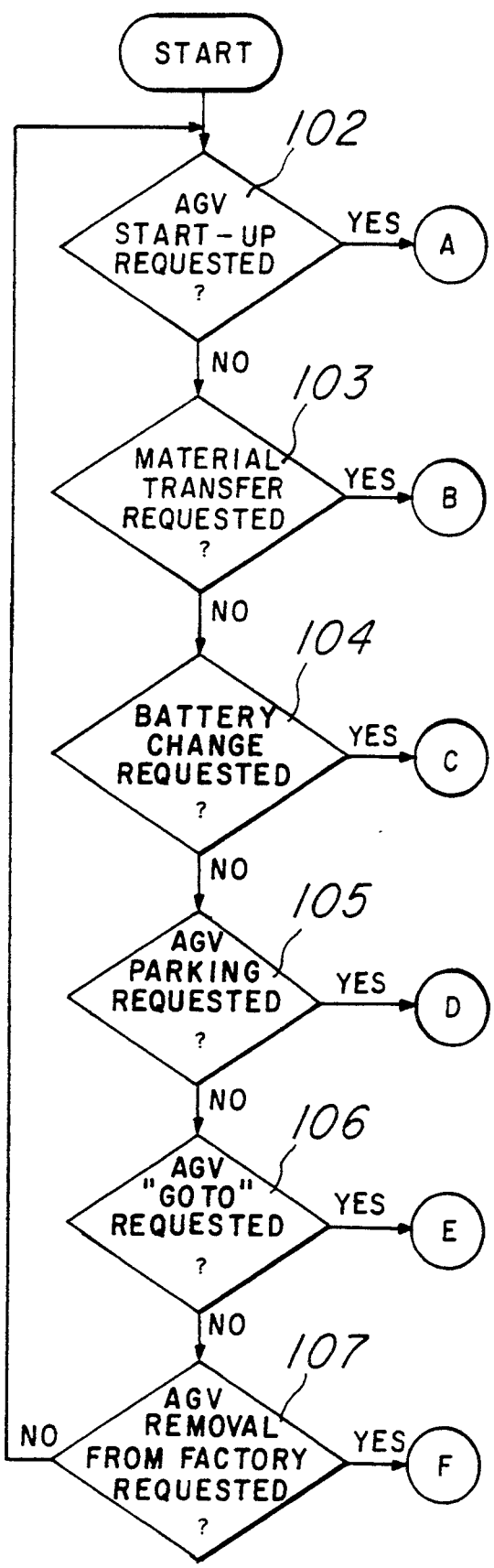
FIG. 2 is a flowchart illustrating the highest level of control in the vehicle application task.

The invention includes the programs necessary to do the jobs outlined in FIG. 2, which is a high-level flowchart showing the major jobs the program may be asked to do. The software outlined in FIG. 2 is designed to run independently while communicating with the system controller. There are six such AGV application tasks in memory simultaneously, as is shown in FIG. 1. The net effect is as if six different computers were operating, each controlling a specific AGV. This gives the system the ability to control six different AGVs simultaneously (from the vantage point of a human operator). The separate Vehicle Application Tasks also communicate with other tasks in the system controller.

Each of the individual application tasks shown in FIG. 2 is detailed in a separate figure (FIGS. 3 through 8). Each job is in fact a separate program which has access to other individual programs, routines, or subroutines. Therefore, the design of the software is modular. Each message from the Message Switcher to the Vehicle Application Task is interpreted in a sequence prescribed by the design of the invention's high-level flow. Therefore, the organization is hierarchical.

The hierarchical organization and modular design make the invention easy to modify. For example, there is no theoretical limit to the number of AGVs which can be in a given control system because each is represented by an individual application task. The practical limit, of course, depends upon the memory size and processing speed of the control computers and on the characteristics of the multitasking operating system. In the current TI implementations, the limit is six AGVs per system controller, with no limit to the number of system controllers used in a given factory. An advantage of using the invention is that (within the capacity limits) AGVs can be added to or extracted from the overall system at will and factories can be expanded or reorganized by adding or subtracting system controllers (effectively, whole systems). This makes for much more flexible operation. Such flexibility is required in modern installations where changes in manufacturing methods and technology occur from month to month, rather than over a period of years.

A typical mode of operation for the system in which the invention is embodied might include a request to send an AGV from a parking node to a machine to pick up a load and then to send the same AGV to another machine to deposit the load. In such a case, an operator uses a computer terminal (part of the system's operator interface, see FIG. 1 item 5) to request the material transfer. As each command is entered, the operator interface passes the command message to the communications controller where the command is decoded. The message switcher task (20 in FIG. 1) in the communications controller (1 in FIG. 1) routes each message to the computer which can handle it. In this case, the message switcher notifies the system controller task 21 in FIG. 1 (the system controller task is in the system controller computer, 2 in FIG. 1), which calls the Vehicle Application Task for the vehicle which must transfer the material. The Vehicle Application Task, which may be any one of 9 through 12 or 18 through 19 in FIG. 1, receives the message and determines that a material transfer is requested. The Vehicle Application Task then calls the scheduler (a subroutine which is in the system controller computer 2 in FIG. 1) to determine when the transfer can be made. When it gets clearance from the scheduler subroutine, the application task calls the router task (which also is in the system controller computer 2 in FIG. 1) and requests a path for the AGV to follow. When the application task receives the path from the router, it moves the AGV along the path and notifies the system controller when the AGV arrives. One method by which this is accomplished is detailed in TI #11113, co-pending. A message also goes to the factory host computer (which is shown in FIG. 1 as 3 but which is not physically a part of the TI system) via the message switcher task because the machine to be serviced may be under the host's control. The material transfer is made under the control of the application or the factory host computer (depending upon how the system is being used) and when it is complete the program returns to the top level of the application task. Essentially, the application task keeps cycling in a loop, waiting for new instructions from the system controller.

An important advantage to the invention's method of operation is that it effects control of an individual AGV without requiring the full-time attention of any other task or the system controller computer. The system controller must be free to act as an executive, allowing for maximum freedom of movement within the system. Each copy of the invention, on the other hand, is dedicated to a single AGV, thereby maximizing control.

PROGRAM OVERVIEW

At system start-up, no AGVs are "enabled." That is, at time zero the system controller begins running before any AGVs. Therefore, the first order of business when a Vehicle Application Task begins running is to Identify the AGV to the system controller. As shown in FIG. 2, the first step of the program at 102 is to determine whether the system controller has requested that the AGV be enabled. During normal operation, the answer will be No because both the system and the AGV are in operation. But, at system start-up and whenever an AGV is being returned to the system (after maintenance, for example), the program branches to A, which is detailed in FIG. 3. At step 202, the program initiates communication with the AGV. This occurs through the message switcher, the system controller's modem, the overhead IR transmitter, the AGV's IR receiver, the AGV controller's modem, and, finally, a communications application task in the AGV's on-board controller. The Vehicle Application Task awaits an answer from the AGV. If there is no answer, the program simply loops back to the start, essentially waiting forever until it "hears from" the AGV. Error handling and time-out routines are used to deal with open program loops. A similar sequence of events occurs any time the Vehicle Application Task must communicate with the AGV, and vice versa.

When an AGV responds, as at step 203, the Vehicle Application Task notifies the visual navigation system (shown as 4 in FIG. 1) that it is to find and track the target AGV. The visual navigation system, in turn, searches the active AGVs to determine whether it can identify the specific AGV it is commanded to track. A method and specific means of accomplishing the search and identification are set forth in TI #12757, co-pending. The Vehicle Application Task expects the visual navigation system to respond with the AGV's current location. When the Vehicle Application Task receives the position update, it issues the commands necessary to move the AGV to the closest available (unoccupied, non-reserved) node. The task then sets the AGV's park flag (a bit that, when set, signals the fact that the AGV is not moving but is enabled and can accept commands) as at step 208.

TRANSFERRING MATERIAL

Assuming the task's AGV already is enabled, the task will pass step 102 without branching to A. The next determination to be made is whether the system controller requests a material transfer. A material transfer is a sequence of moving the AGV to a node and either loading or unloading material upon arrival at the node. Some AGVs are equipped with mechanisms used to transfer material to or from a storage point on the vehicle to or from a load or unload point on a machine. These mechanisms may be either active or passive. An active mechanism is something like a robot, which can reach out and retrieve materials and then put them on the AGV. A passive mechanism is something like a set of rollers, which merely accept whatever is pushed onto them.

Figure 4:
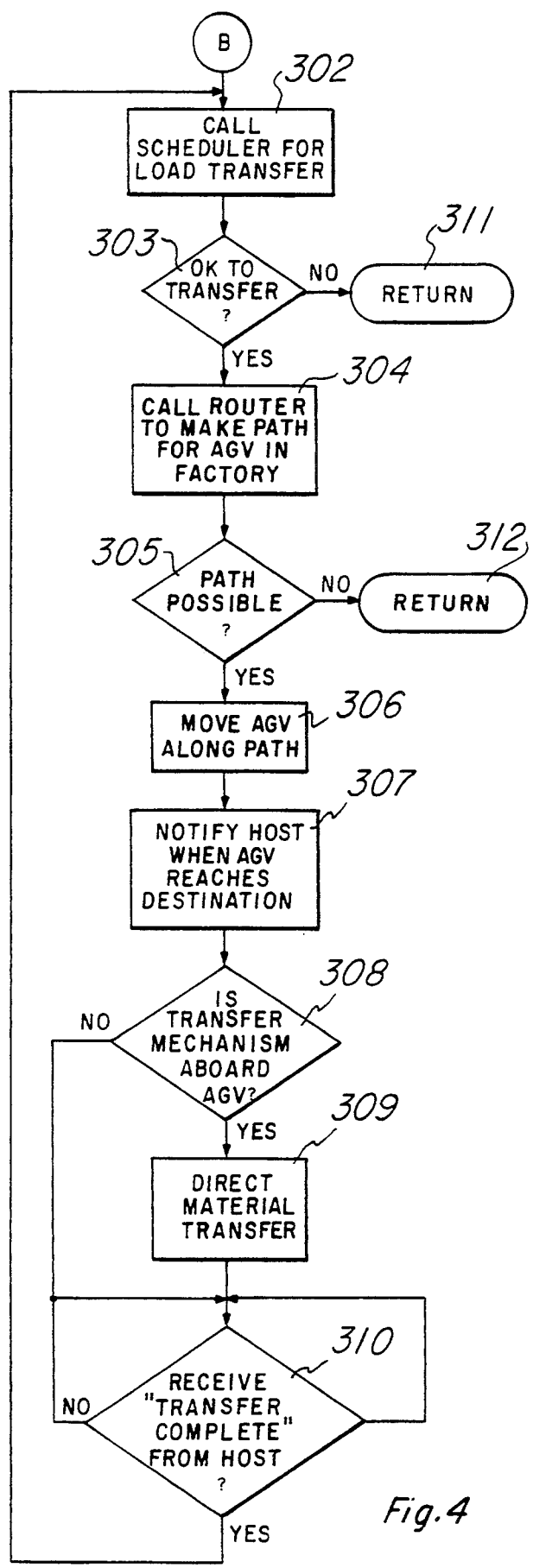
FIG. 4 is a flowchart illustrating the control action of the invention when the AGV is to transfer a load.

If a material transfer is requested, the Vehicle Application Task branches to B at step 103. As shown in FIG. 4, the task next requests clearance from the scheduler task. The scheduler's Job is to moderate the continual stream of requests from the different Vehicle Application Tasks so that the flow of material throughout the system supervised by the system controller is orderly. If the scheduler does not approve the transfer, the routine simply returns as at step 311 and the loop repeats. If the transfer is approved, then the routine requests at step 304 a path assignment from the router task.

Figure 3:
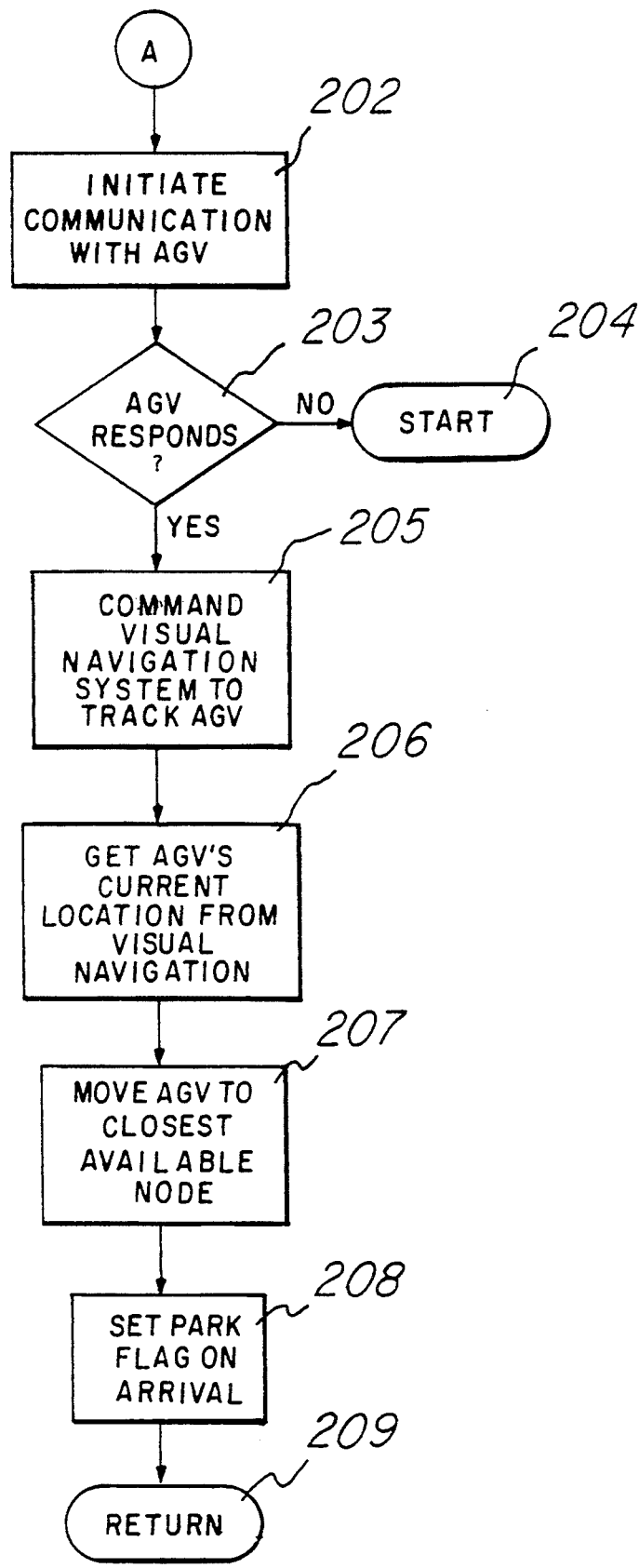
FIG. 3 is a flowchart illustrating the control action of the invention at initialization (when the program is started).
Figure 7:
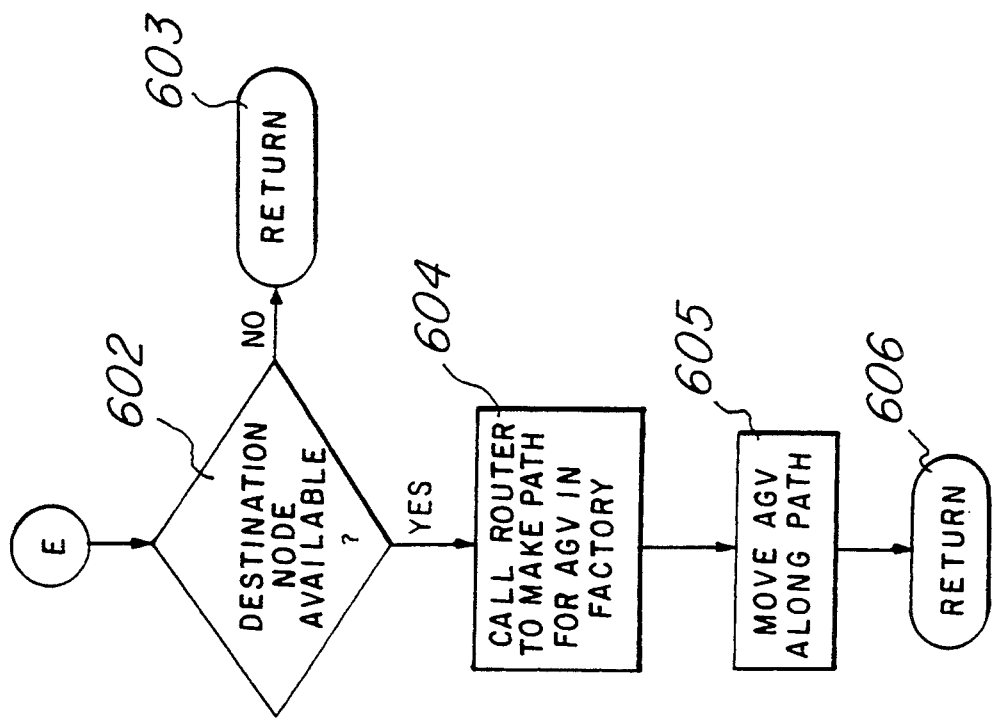
FIG. 7 is a flowchart illustrating the control action of the invention when a vehicle is to be moved.

Each of the separate Vehicle Application Tasks in a system has independent access to the router task. The router's job is to find all possible paths from one point to another in the factory map and to check the rules of travel for the paths to be sure that each path it sends to the central data base is cleared for the AGV which requested it. The rules of travel are set so as to prevent collisions or deadlocks between AGVs. The method is set forward in application TI#111104, co-pending. Once the path has been set and verified, as at steps 304–305 (the routine simply returns at 312 if no path can be described), the program issues a move command at step 306. One method (and the specific means) of doing this is detailed in application TI #11113, co-pending. As shown in FIG. 7, if the node is free the routine calls the router task (as before) at step 604 to build a path for the AGV through the factory. Then, at step 605, the task commands the AGV to move to its destination. The Vehicle Application Task then returns at step 606 and re-enters the top-level loop illustrated in FIG. 2 at step 108. Returning now to FIG. 5, the AGV begins to move along the path at step 404. The visual navigation system tracks the AGV during the move. In fact, one of the first things the Vehicle Application Task does is initiate tracking, as shown in FIG. 3 step 205. Returning now to FIG. 4, step 307 shows that once the vehicle reports a position which matches that of the destination the AGV notifies the host computer that the AGV has arrived. What happens at this point is that the Vehicle Application Task notifies the host that the AGV has reached its destination. The host completes its task for this AGV by executing the instructions for what is to happen at the destination. The instructions include a message to be sent to the host computer. The system controller sends this message via another task called the Protocol Translator. The protocol translator is a "personality" module. That is, it is a program which converts messages from the system controller to messages in a format suitable for reception by a particular type of external computer. In a typical AGV system, this external computer might be a block or cell controller. In any event, the protocol translator "speaks the language of" the computer which controls the machine at the AGV's destination.

What happens next depends upon whether the system is designed to drive or to be driven by the factory controllers. At step 308 the decision is made either to have the AGV's onboard vehicle controller program or the factory machine's controller direct the transfer of material, as at step 309. At step 310, the Vehicle Application Task goes into a wait loop until it receives a message indicating that the transfer is complete. This message can come from either the factory host computer, the block or cell controller, or the AGV's onboard controller, depending upon the system design. Once the message is received, the material transfer loop routine contacts the scheduler (step 302) again for further instructions. If there is no further material transfer in the schedule, the program returns at step 311 and re-enters the high-level Vehicle Application Task loop at step 103.

It is important to note the flexibility in the material transfer routine. Each of the routines or subroutines noted in the flowchart is an independent module. Therefore, the modules can be located anywhere, so long as the Vehicle Application Task can communicate with them. This means that for any given AGV system, some or all of the material transfer mechanisms can be aboard AGVs, some or all can be machine-dependent, some or all can be human (a machine operator simply presses a button on the AGV to signal the load transfer complete), and some or all can be from one AGV to another. Additionally, some or all of the AGVs can include active, or passive, material handling mechanisms. Finally, the control of material transfer can reside in the AGV onboard controller, the machine to be serviced, or the factory, block, or cell controllers. The modular, hierarchical organization of the Vehicle Application Task and the overall control scheme adds much versatility to conventional, more limited, AGV control schemes.

CHANGING AN AGV'S BATTERY

Figure 5:
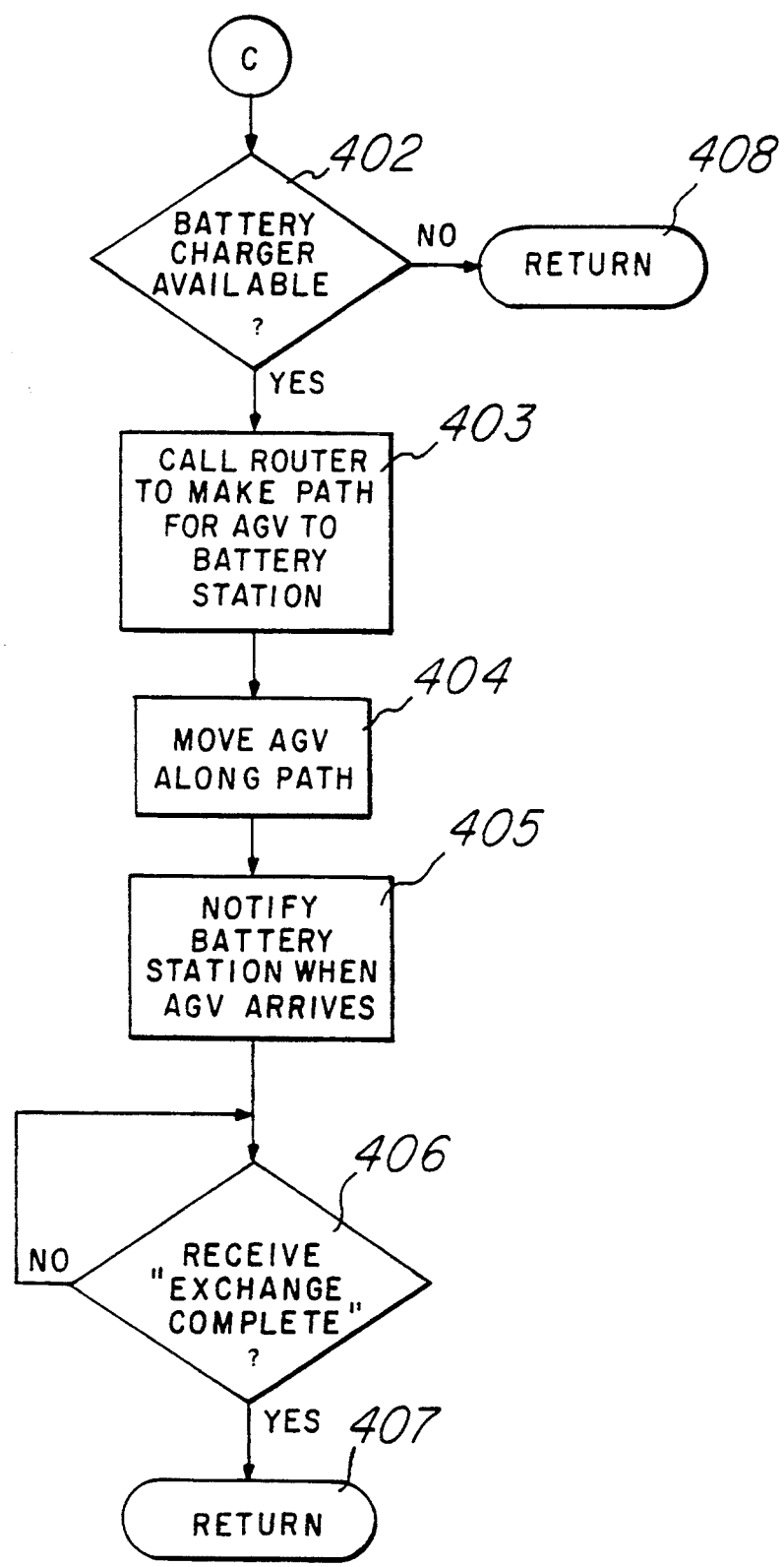
FIG. 5 is a flowchart illustrating the control action of the invention when a vehicle battery must be changed.

Returning now to FIG. 2, at step 104, the next determination is whether the AGV's battery must be changed. There are three ways a battery change can be started. The message path used depends upon where the battery change request originates. The AGV has a battery charge indicator and sensor which signals the system controller when the energy reserve drops to a certain level. The automatic battery change station includes an operator interface which can be used to signal the system controller to change a particular AGV's battery. The operator interface at the base station (where the system controller is located) also can be used to request a battery change. Regardless of where the request originates, it is the Vehicle Application Task which reacts to the request. As shown in FIG. 5, the first action is to determine whether the battery changer is available, as at step 402. If not, the routine returns, effectively looping until the changer becomes available or until the error or time-out condition is resolved. In some systems there is no automatic battery changer. In such a case a manual battery change system is assigned a particular parking node and the routine in the Vehicle Application Task is set to answer Yes at step 402 if that node is available.

In any case, when the battery changer is available the routine next calls the router task to set up a path through the factory for the AGV. The origin is the AGV's current node; the destination is the parking node at the battery change station. Next, as detailed in application TI #11113, co-pending, and illustrated here at step 404, the Vehicle Application Task issues a move command to the AGV which moves along the path until it reaches its destination and, at step 405, notifies the battery station on arrival. A software task which drives the automatic battery station then takes over and exchanges the discharged battery for a freshly charged one from the station. When the battery station has made the exchange, It sends a message through the communications controller to the Vehicle Application Task. Meanwhile, the Vehicle Application Task waits in a loop at step 406 for the "Exchange Complete" message. Upon receipt of this message, the routine returns at step 407, re-entering the top-level Vehicle Application Task loop at step 104.

As in the discussion of the previous routine, an Important advantage of this approach is that since the Vehicle Application Task's structure is modular, and since it is organized hierarchically, the request to change a battery can be made from any of the other independently operating tasks. Furthermore, since the battery change station is Identified simply as a node where the AGVs are directed to park, the battery change station can be moved at will or it can be deleted from the factory altogether with nothing more than an instruction entered at a computer terminal. This can be invaluable in modern manufacturing systems where machinery is moved, regrouped, and moved again as product lines change frequently. It also is useful in routine operations (for example, when a battery change station must be disabled temporarily for servicing: you simply use the operator interface terminal to set the battery station node status to "unavailable").

PARKING AN AGV

Returning now to FIG. 2, step 105 the Vehicle Application Task next checks whether the system controller has requested that the task's AGV be parked. There are a number of reasons for parking an AGV. For example, an operator might notice something wrong with the AGV or its load; rather than pressing an emergency stop button the operator may choose to park the AGV normally first. Or, if the scheduler has no jobs for a particular AGV it may send the AGV to a parking node so as to free up another path for use by working AGVs. The fact that an AGV can be commanded to park without interrupting system operation or introducing personnel into a production area adds a level of flexibility to the factory control system. The invention's means of accomplishing this adds an additional level: the system controller or another application task can decide that an AGV should be parked, without requiring operator assistance or intervention.

Figure 6:
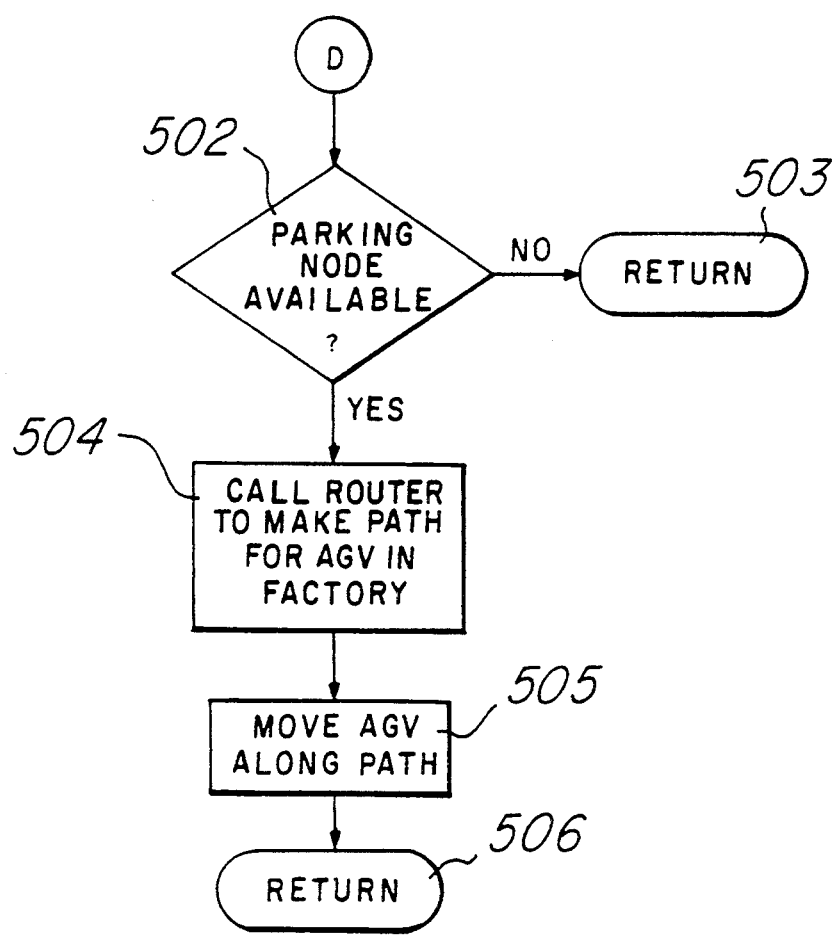
FIG. 6 is a flowchart illustrating the control action of the invention when a vehicle is to be parked.

When a parking request is received, the Vehicle Application Task branches to D, which is described in FIG. 6. At step 502 the parking routine first determines whether a parking node is available. There are only two distinctions between a parking node and any other node. First, a parking node normally is "off the beaten path," as at a cul-de-sac in the factory map (the idea is that the node should only be used for parking and not for factory machine service). Second, a parking node is so identified in the factory map (which allows any application program to park an AGV without being required to specify the exact node to use). In any case, either "any," or an exact, parking node can be specified. From the human operator's viewpoint, the user just commands the system to park an AGV (either at a specific location or at any available location). But in either case the system controller always assigns a specific node to the AGV to be parked. The system controller checks to be sure the node is unoccupied. If the node is occupied, the routine simply returns and loops until a free parking node is found or until the exact node, if specified, is free. Otherwise, the routine continues to step 504, where it notifies the router task to assign a path from the AGV's current node to the parking node. This occurs in the manner identified above for steps 304 and 403. Once the path is reserved, the Vehicle Application Task issues a move command (again, one means of accomplishing this is detailed in application TI #11113, co-pending) and the AGV moves along the path to the parking node. When the AGV reaches the parking node, it stops and sets its parking flag (a status bit) so that the different application tasks can identify the AGV's status as they continue operation. The routine returns at step 506 and re-enters the top-level task at step 105.

MOVING AN AGV

As shown in FIG. 2, there are several different routines identified in the top-level application task flowchart. All but the first and the last require the task's AGV to move. At first glance, it would appear to be desirable to separate the "move AGV" part of these routines and make it a stand-alone task. In traditional AGV systems as well as some newer systems which feature modular programming, this is precisely the case. However, in the Vehicle Application Task, organization is by job rather than command. The jobs, in turn, are structured as hierarchies of low-level routines or subroutines. The common routines such as "move" occur at this lowest level of organization, well away from the higher-level control loops which must be free to operate at the "system" level to improve efficiency and response time. It also is important to remember that there may be as many as six independent AGV application tasks operating simultaneously. Therefore, the mid-level programs such as those identified as branches A through F should be fairly self-sufficient to avoid having to wait on common low-level subroutines which may be tied up by another task.

As shown in FIG. 7, the branch at E begins with checking at step 602 to be sure that the destination node is available (unoccupied). If the node is occupied, the routine returns at step 603 and loops until the node is free or the application task processes another job. If the node is free, the routine calls the router task (as before) at step 604 to build a path for the AGV through the factory.

REMOVING AN AGV FROM THE SYSTEM

As shown in FIG. 2, the last check made at the top-level Vehicle Application Task loop is whether the system controller has requested that the task's AGV be removed from the system. If the answer is No at step 107, then the current sweep of the Vehicle Application Task's loop is complete and the program returns to the start and begins again.

Figure 8:
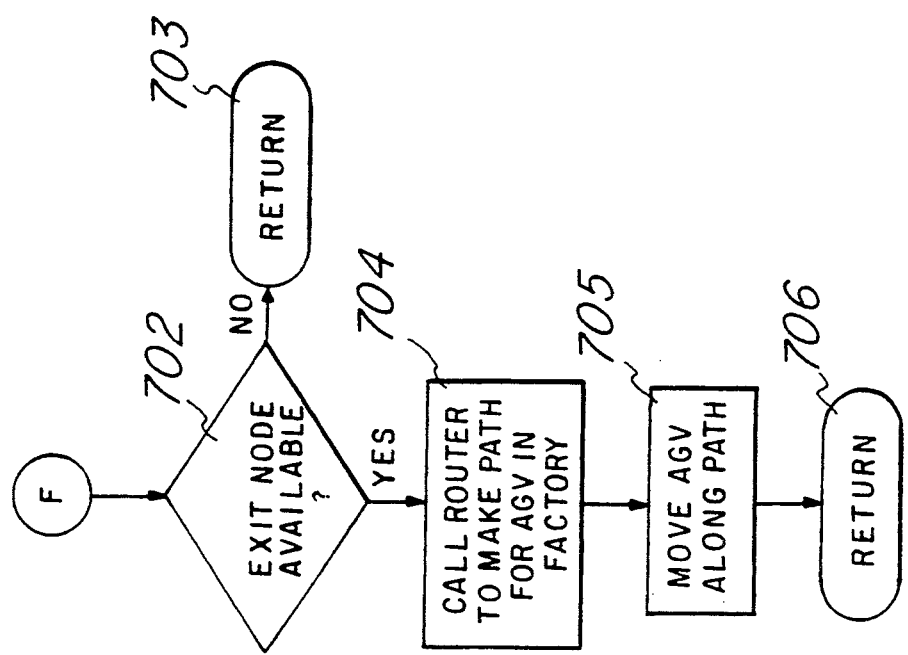
FIG. 8 is a flowchart illustrating the control action of the invention when a vehicle is to be removed from the system.

If the answer at step 107 is Yes, the task branches to F, which is described in FIG. 8. The first check, at step 702, is whether an exit node is available (unoccupied). An exit node is a node defined to be used to introduce or remove vehicles from the system. The node is defined by operators when the factory map is created. If the exit node is occupied, the routine loops at step 703 until the node becomes available or the application task receives another job. If the exit node is free, the routine signals the router at step 704 (as before) to make a path through the factory for the AGV. As before, this assignment is executed by a method identical to that explained in application TI #11113, copending, or its equivalent.

What is claimed:

1. A hierarchical control method for communicating with and controlling a plurality of AGVs, comprising:
   (a) providing a system controller (2) to communicate with a plurality of AGVs;
   (b) running a plurality of vehicle-application-task computer programs independently and concurrently by said system controller, each of said vehicle-application-task computer program is associated with each AGV;
   (c) generating commands, using said vehicle-application-task computer programs, for each associated AGV;
   (d) running, by said system controller, a system-controller-task computer program independently and concurrently with said vehicle-application-task computer programs to generate communicating commands for a selected AGV to the vehicle-application-task program associated with said selected AGV; and
   (e) communicating and controlling a plurality of AGVs using the generated commands.

2. The hierarchical control method of claim 1, further comprising:
   running a visual-navigatin-task computer program concurrently with other computer programs; and
   using said visual-navigation-task computer program to determine the position of each of said AGVs.

3. The hierarchical control method of claim 1, further comprising:
   providing a vehicle controller on board each AGV.

4. The hierarchical control method of claim 3, further comprising:
   providing a communication link from said system controller to said vehicle controller; and
   communicating commands from said system controller to said vehicle controller.

5. The hierarchical control method of claim 1, further comprising:
   running a scheduler-task computer program concurrently with said other computer program; and
   using said scheduler-task computer program to generate routes for said AGVs.

6. A hierarchical control system for communicating with and controlling a plurality of AGVs, comprising:
   (a) a system controller (2) for communicating with and controlling a plurality of AGVs;
   (b) vehicle-application-task controllers (9–12 and 18–19) running a plurality of programs each of said vehicle-application-task controllers is associated with each AGVs, wherein:
      (i) said vehicle-application-task controllers run programs independently and concurrently by said system controller, and
      (ii) each of said vehicle-application-task controllers runs programs for generating commands for its associated AGV; and
   (c) a system-controller-task controller (21) for running a program for communicating commands for a selected AGV to the vehicle-application-task controller which runs a program associated with said selected AGV, wherein:
   said system-controller-task controller and its program is run independently and concurrently with said vehicle-application-task controller and program by said system controller.

7. The hierarchical control system of claim 6, further comprising:
   (a) a visual-navigation-task controller and program for determining the position of each of said AGVs, wherein:
   said visual-navigation-task controller and program is run concurrently with said other computer programs by said system controller.

8. The hierarchical control system of claim 6, further comprising:
   a vehicle controller (6) on board each AGV.

9. The hierarchical control system of claim 8, further comprising:
   a communication link for communicating commands from said system controller to said vehicle controllers.

10. The hierarchical control system of claim 6, further comprising:
    (a) a scheduler-task controller for generating routes for said AGV's, wherein:
    said scheduler-task controller runs a scheduler-task program which is run concurrently with said other computer programs by said system controller.

* * * * *